United States Patent [19]

Brandenburg, Jr.

[11] Patent Number: 4,497,311
[45] Date of Patent: Feb. 5, 1985

[54] SUN TRACKING SOLAR AIR HEATING SYSTEM

[76] Inventor: Frank J. Brandenburg, Jr., Rte. 1, Box 487 S, Ashland, Va. 23005

[21] Appl. No.: 412,525

[22] Filed: Aug. 26, 1982

[51] Int. Cl.³ .................................................. F24J 3/02
[52] U.S. Cl. ..................................... 126/425; 126/429; 126/432; 126/435; 126/438; 126/441; 126/446; 165/181
[58] Field of Search ............... 126/424, 425, 428, 429, 126/432, 438, 441, 442, 443, 446, 448, 450, 451, 435; 165/181, 182, 183

[56] References Cited

U.S. PATENT DOCUMENTS

| | | | |
|---|---|---|---|
| 3,102,532 | 9/1963 | Shoemaker | 126/441 |
| 3,985,119 | 10/1976 | Oakes | 126/438 |
| 4,068,652 | 1/1978 | Worthington | 126/429 X |
| 4,111,360 | 9/1978 | Barr | 126/438 X |
| 4,138,997 | 2/1979 | LaPorte et al. | 165/182 X |
| 4,147,154 | 4/1979 | Lewandowski | 126/425 |
| 4,356,812 | 11/1982 | Haven | 126/438 |

FOREIGN PATENT DOCUMENTS 1072846  3/1980  Canada ................................. 126/429

*Primary Examiner*—Margaret A. Focarino
*Attorney, Agent, or Firm*—Harvey B. Jacobson

[57] ABSTRACT

A heating system for buildings such as dwelling houses, office buildings, commercial establishments, industrial establishments, and the like, in which it is desired to maintain a comfortable temperature level during periods when the external air temperature is relatively low. The heating system includes a solar collector mounted on the roof of the building in a manner so that it is exposed to the rays of the sun and pivotally supported and driven by a mechanism so that the solar collector can track or follow the sun as it moves from sun up to sundown. A flexible duct system interconnects the solar collector and the rooms or areas to be heated through a distribution box. The flexible duct extends through a weathertight aperture in the roof to facilitate movement of the solar collector with a check valve and blower being employed in the system to circulate air and to prevent flow of warm air from the rooms into the solar collector at night which may cause condensation in the collector. The solar collector includes double glazing, a plurality of screen grids and a coil or tube assembly provided with projecting fins on opposite sides which areoriented in angular relation to the longitudinal axis of the tubes for more efficient impingement of the rays of the sun thereon thereby providing more efficient collection of the energy of the sun. The collector is provided with an upwardly extending peripheral shield which angulates outwardly for more effective collection of the rays of the sun and also preventing cold air from moving across the surface of the glazing on the collector.

10 Claims, 9 Drawing Figures

SUN TRACKING SOLAR AIR HEATING SYSTEM

BACKGROUND OF THE INVENTION

1. Field of the Invention

The present invention relates to a solar heating system for a building such as a dwelling house in which a sun tracking solar collector is mounted on the roof at a desired angular relation to the horizon and pivotally supported and driven so that it tracks the sun during its movement across the sky from sun up to sundown with the collector being connected to the room or rooms to be heated through a flexible duct system provided with a blower, check valve and a distribution box to provide a flow of heated air into the room or rooms when desired and prevent flow of air through the duct system at other times.

2. Description of the Prior Art

Solar heat has been used to heat buildings and conventionally have employed a liquid circulating system in which a roof mounted solar collector has a heat absorbing tube assembly installed therein and either connected directly to the heating system or connected to the heating system for the building through a heat exchanger arrangement. Also, solar heating systems have been provided which utilize rocks or other materials to store heat so that air may be circulated in relation to such materials for providing a hot air heating system. Various types of solar collectors have been employed all of which basically include a box-like container having an open upper surface which is usually glazed with an absorber coil or plate in the interior of the container and connected with an arrangement for effectively utilizing the solar heat for various purposes.

SUMMARY OF THE INVENTION

An object of the present invention is to provide a sun tracking solar air heating system which includes a solar collector mounted on the roof of a building and oriented in an inclined relation to the horizon and pivotally supported and driven in a manner to track the sun for efficient utilization of the rays of the sun.

Another object of the invention is to provide a heating system in accordance with the preceding object in which the solar collector includes a heating coil or tube assembly having laterally projecting fins thereon in which the fins are oriented in an inclined relation to a plane passing through the longitudinal axis of the tubes and oriented on opposite sides of the tube in longitudinal alignment with each other together with a plurality of screen grids overlying the tube and fin assembly and an upwardly and outwardly inclined shield plate peripherally of the collector for effective utilization of the rays of the sun and preventing movement of cold air over the top glazed surface of the collector.

A further object of the above invention is to provide a heating system in accordance with the preceding object in which the solar collector is communicated with the room or rooms to be heated by a flexible duct assembly which extends through a hole in the roof to a distribution box or plenum chamber and thus to the individual rooms involved with a blower and check valve being incorporated into the duct system for circulation of air when desired and precluding air circulation when the blower is not activated thereby preventing flow of warm air from the building into the solar collector at night or during cool periods thereby preventing condensation on the top glazed surface of the collector.

Still another object of the invention is to provide a heating system in accordance with the preceding objects in which the motor and mechanism for pivoting the collector for tracking the sun is located interiorly of the building and connected with the collector through a flexbile duct to maintain the waterproof integrity of the building roof.

Yet another object of the present invention is to provide a heating system employing circulating air and a roof mounted sun tracking solar collector which is efficient in converting the energy of the sun into useful heat energy, relatively inexpensive to manufacture and maintain, cost effective and versatile in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
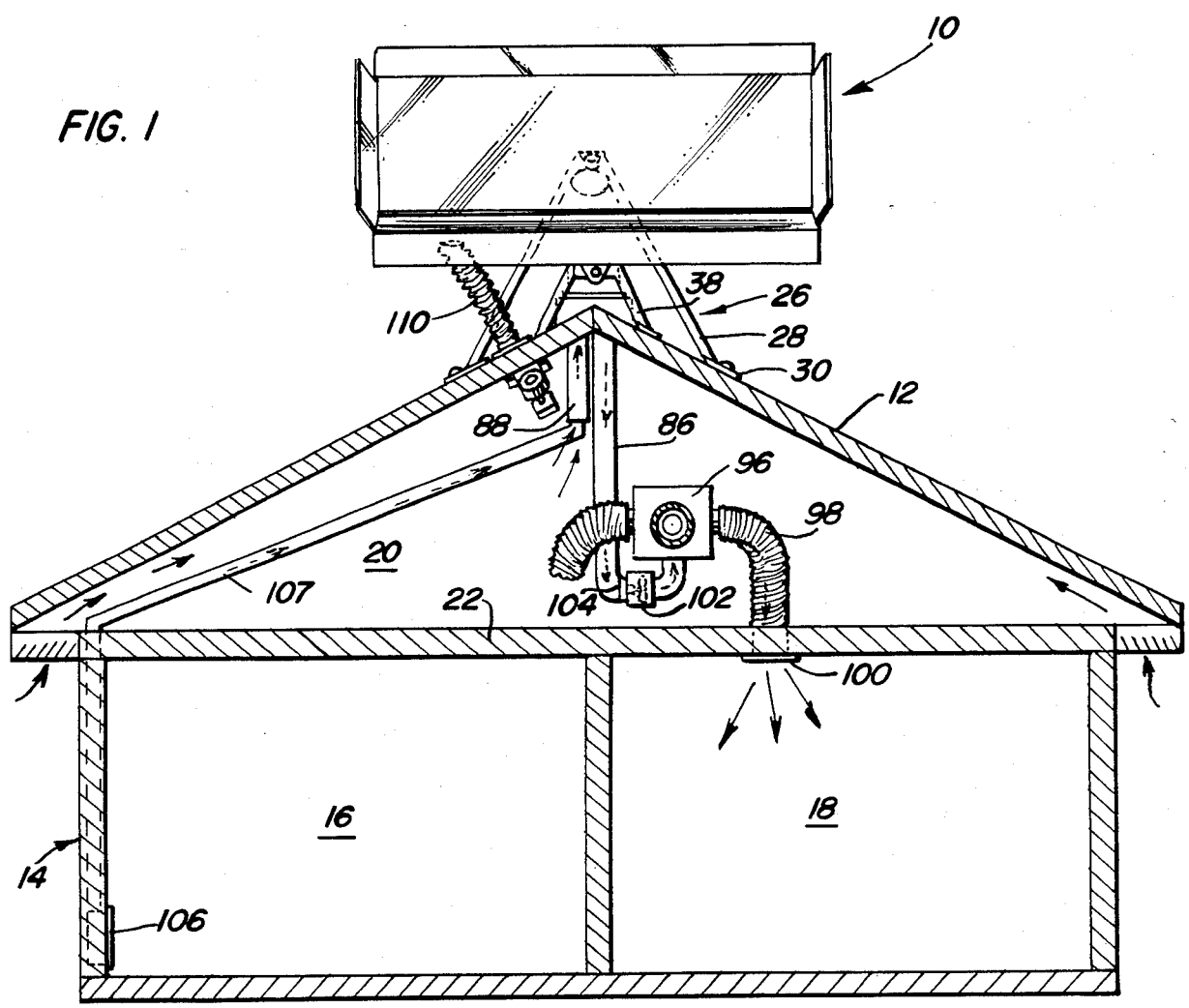
FIG. 1 is a schematic illustration of the heating system of the present invention illustrating the orientation of the solar collector on the roof of a building such as a dwelling house together with the association of the other components of the invention therewith.
Figure 3:
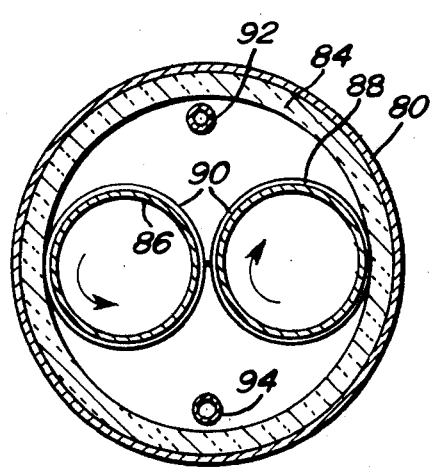
FIG. 3 is a transverse sectional view, on an enlarged scale, taken substantially upon a plane passing along section line 3—3 of FIG. 2 illustrating the flexible duct assembly.

Referring now specifically to the drawings, the solar heating system of the present invention includes a solar collector generally designated by reference numeral 10 which is supported from a roof 12 of a building structure generally designated by numeral 14 which is illustrated in the form of a dwelling house having a plurality of rooms 16 and 18 and an attic space 20 above the room ceilings 22 with the roof 12 being a conventional gable-type roof and the collector 10 mounted on the ridge or apex thereof. However, the heating system including the collector 10 can be associated with various types of buildings having various types of roof structures or the collector 10 may be supported solely on a slanting or inclined surface of the roof depending upon the orientation of the roof in relation to the sun with it being essential that the collector 10 have maximum exposure to the sun and not be in an area shaded by adjacent buildings, trees and the like.

Figure 2:
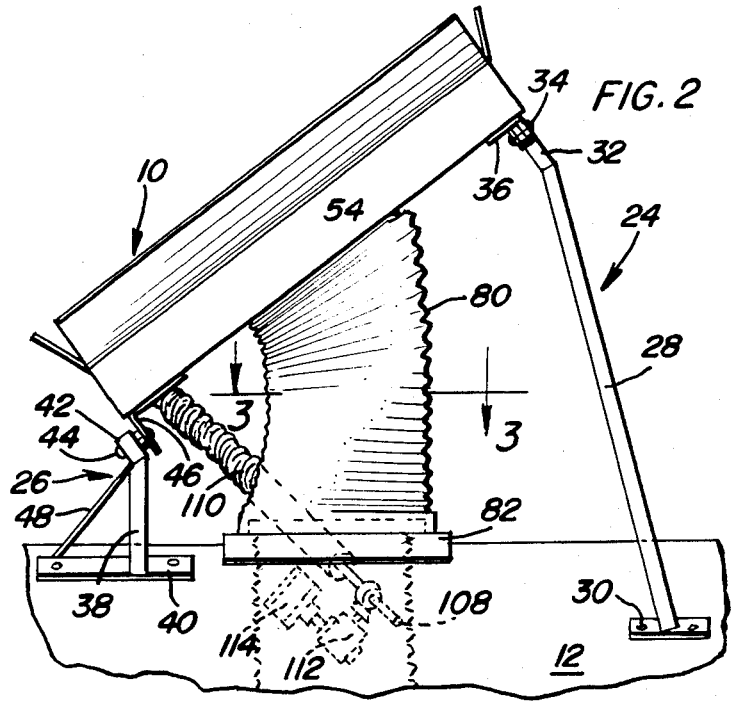
FIG. 2 is an elevational view of the solar collector and the structure for mounting it on a roof and connecting the collector to the roof with flexible ducts.

The solar collector 10 is supported from the roof 12 by a pair of bracket assemblies 24 and 26 which are constructed and arranged so that the solar collector will be inclined in relation to horizontal or the roof ridge as illustrated in FIG. 2 with the bracket assembly 24 including a pair of supporting legs 28 in the form of structural members having a plate 30 at the lower end thereof for mounting on the roof 12 by the use of any conventional fastening arrangement. The legs 28 converge upwardly and are connected at their upper ends by an angulated portion 32 secured to the bottom of the collector 10 by a pivot bolt 34 which extends through a depending lug or bracket 36 on the collector 10. The bracket assembly 26 includes a similar arrangement including a pair of upwardly converging legs 38 with elongated plates or straps 40 at the lower ends thereof for mounting on the roof and the upper ends of the legs 38 are interconnected by an offset portion 42 and a pivot bolt 44 connects the bracket assembly 26 to a bracket 46 attached to the solar collector 10 with the pivot bolt 46 being aligned with the pivot bolt 32 on a pivot axis inclined in relation to the ridge of the roof to enable the solar collector 10 to pivot about an inclined axis to follow the path of the sun. The legs 38 of the bracket assembly 26 may be provided with brace elements 48 to rigidify the bracket assembly 26.

Figure 6:
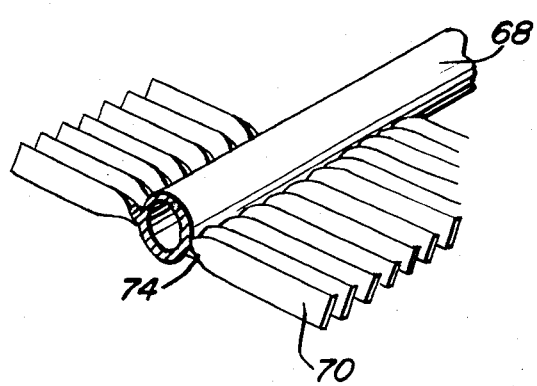
FIG. 6 is a fragmental perspective view of the tube and fins thereon.

The solar collector 10 is a receptacle or container of box-like configuration which includes a bottom wall 50, upstanding end walls 52 and sidewalls 54 which are longer than the end walls to define a generally rectangular configuration with the walls and bottom including a layer of insulation 56 secured in place in any suitable manner and including a foil reflective surface 58 on the interior surface thereof. The upper surface of the collector 10 is provided with a pair of parallel, spaced glazing members 60 forming a dead air space 62 therebetween. Underlying the inner glazing member 60 is a plurality of screen grids 64 which are spaced from each other and may vary in number although it is preferred that seven screen grids be used. The screen grids 64 may be metallic screen wire or fiberglass mesh material or the like and the glazing member may be glass, plastic or the like with the periphery of these components being secured to the collector 10 in any suitable manner such as having the periphery thereof received in supporting structures, the insulating material or the like. Disposed above the foil reflector 58 on the insulation 56 above the bottom member 50 and below the lowest screen grid 64, there is provided a heat absorber generally designated by numeral 66 in the form of a serpentine or coiled tube 68 which may be either continuous or may be in the form of a plurality of tubes oriented in parallel relation and interconnected at their ends by a header. Positioned on the tube or tubes 68 is a plurality of fins 70 which are integral with the tube 68. As illustrated in FIG. 6, the fins 70 extend from opposite sides of the tube 68 and are oriented in longitudinal alignment and are of equal length and preferably of the same material as the tube 68 for efficient heat conduction. Each of the fins 70 is angulated in relation to a plane which passes through the fins and the longitudinal axis of tube 68 so that the fins are longitudinally spaced, oriented in parallel relation to each other and include an inclined face directed toward the sun's rays 72. The fins are constructed from a plate type heat absorber which has a plate or flange integral with the tube 68. Slits are formed in the plate and the fins are twisted so that they are angulated as illustrated in FIG. 6 and oriented in spaced parallel relation to each other with the twisted area 74 interconnecting the inner ends of the fins 70 with the tube 68 with the tube and fins being of unitary construction and preferably of metallic construction such as copper, aluminum or the like for good heat transfer from the fins into the tube and into water circulating through the tube 68.

To more effectively collect the rays of the sun and to prevent movement of cold air or wind over the upper glazing member 60, the sidewalls 54 and the end walls 52 have upwardly extending shields 76 thereon which diverge outwardly slightly to reflect sun rays into the interior of the collector 10.

With this arrangement, the collector will effectively collect and absorb the heat from the rays of the sun with the glazing, dead air space and screen grid serving to increase heat storage and thus increase the temperature both above and below the water tube 68 and the fins 70. With this arrangement, water can be circulated through the heat absorber 66 and used to heat the room or rooms of a building 14, used for domestic hot water or the like. When the collector is used for heating air, the copper or aluminum heat absorber will absorb the heat from the sun rays and increase transfer of solar heat to the air as compared to using one side of the absorber or no absorber at all. The center of the bottom 50 of the collector 10 is provided with an opening 78 which may be rectangular or circular and is connected to a flexible duct 80 that extends to and is connected with the roof 12 in watertight relation to an aperture therein by flashing 82. The duct 80 has insulation 84 on the interior thereof and receives smaller flexible hot air and cold air ducts 86 and 88 which may have insulation 90 thereon. This structure enables air circulation through the collector 10 as well as pivotal movement of the duct.

In addition to the flexible air ducts 86 and 88, water conduits 92 and 94 are provided for connection with the heat absorber 66 with these conduits 92 and 94 also being flexible and provided with insulation although a non-freezable liquid may be used for circulation. The spatial area within the flexible duct 80 that is not occupied by the ducts or conduits therein may be closed by insulating material or a closure plate at the top and bottom of the flexible duct 80 to prevent passage of ambient air between the attic space 20 and the interior of the collector 10 through the flexible duct 80.

The hot air duct 86 is connected with the bottom of a distribution box or plenum chamber 96 located in the attic space and supported therein in any suitable manner with branch ducts 98 extending to registers 100 in the rooms 16 and 18 which may be either connected with the ceiling or, if desired, the registers 100 can be located adjacent the lower outer periphery of the rooms. The duct 86 forms an air trap and is provided with an air circulating blower 102 for providing a desired velocity to the air for circulating the air into the rooms. Also, a gravity operated pivotal damper or check valve 104 is provided in the duct 86 between the blower and distribution box 96 to prevent upward movement of heated air from the rooms 16 and 18 into the collector 10 at nighttime or other periods when the heating system is not being used in order to prevent the warm, moist air from condensing interiorly of the collector, particularly on the under surface of the glazing. In the event there is any condensation in the collector, a drain tube or weep hole may be provided at the lower corners of the collector. The cold air duct 88 provides return of air from the rooms to the solar collector. This can be accomplished by providing one or more return registers 106 communicating the rooms with the return air duct 107 so that air may pass from upwardly through the cold air flexible duct 88 into the solar collector 10 with the blower serving to circulate air through the collector 10. The duct 88 may likewise have a distribution box and a gravity operated check valve or damper incorporated therein for closing the flexible duct 88 when air is not being circulated by the blower. Alternatively, a return air plenum chamber may be provided in the attic space with the cold air duct 88 connected thereto and branch ducts provided from each of the rooms or the attic space to the return plenum chamber.

Figures 7, 8, 9:
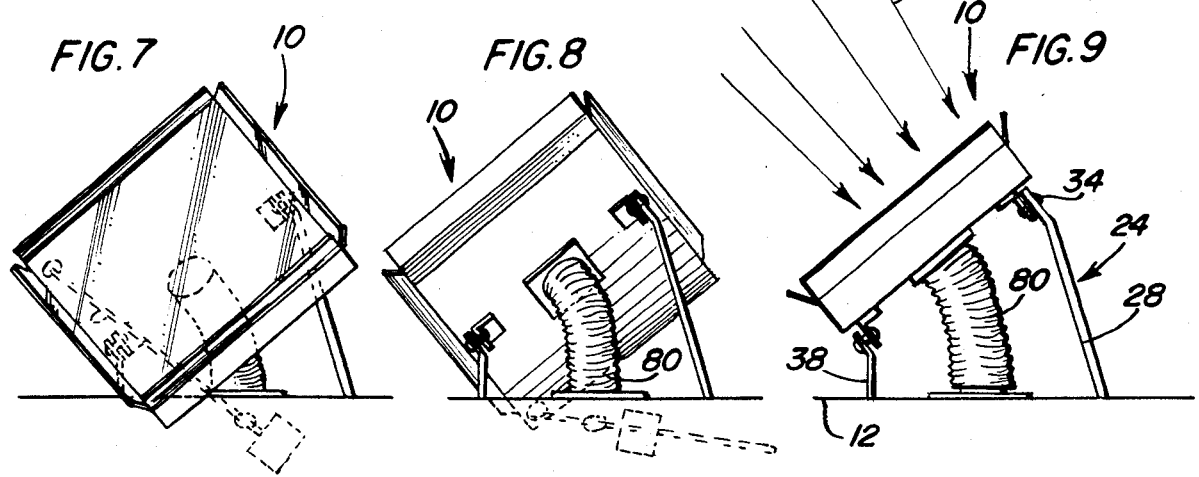
FIGS. 7–9 are progressive schematic views illustrating the tracking movement of the solar collector as it follows the sun.

The lower corner of the solar collector 10 is connected to an elongated externally threaded shaft 108 which is pivotally connected thereto and is enclosed in a flexible duct 110 sealingly connected to the bottom of the collector 10 and an opening in the roof through which the threaded shaft 108 extends. The lower end of the threaded shaft 108 is drivingly connected to a swively mounted gear reduction arrangement 112 and a reversible motor 114 which is controlled by a pair of timers so that one of the times will pivot the collector 10 so that it will follow the sun from sun up to sundown. Thereafter, the second timer which can be incorporated into one unit, will reverse the motor 114 and return the collector to its original position while the sun is not shining, during the night, so that the collector will be back in its original position the next morning so that it can follow the sun in another cycle of operation. FIGS. 7, 8 and 9 illustrate schematically the positions of the collector 10 with FIG. 7 illustrating the collector in its position in the morning so that it will face the sun as it rises and track it until it reaches a noon position as illustrated in FIG. 9 and then a late afternoon position as illustrated in FIG. 8 with the timer controlled motor 114 returning the collector 10 from the position of FIG. 8 to the position of FIG. 7 during the night.

The solar collector may be installed on various types of roof structures with the supporting structure orienting the solar collector at a particular angle with the angle being different for different geographical locations and the pivotal movement or tilting movement of the solar collector as it follows the sun or tracks the sun may also include a structure to vary the angle in relation to the horizon. While some installation may require only the heating system of the present invention, if necessary, conventional heating system may be used as a backup system and the heating system of the present invention may be incorporated into various types of buildings including homes which have vents in the soffits as illustrated in FIG. 1 so that outside air may be introduced into the system by communicating the cold air duct with the attic space adjacent the ridge of the roof so that air moving upwardly along the inner surface of the roof will enter the solar collector. If it is desired to exclude outside air, the return duct could be connected directly to the rooms in a conventional manner.

Figure 4:
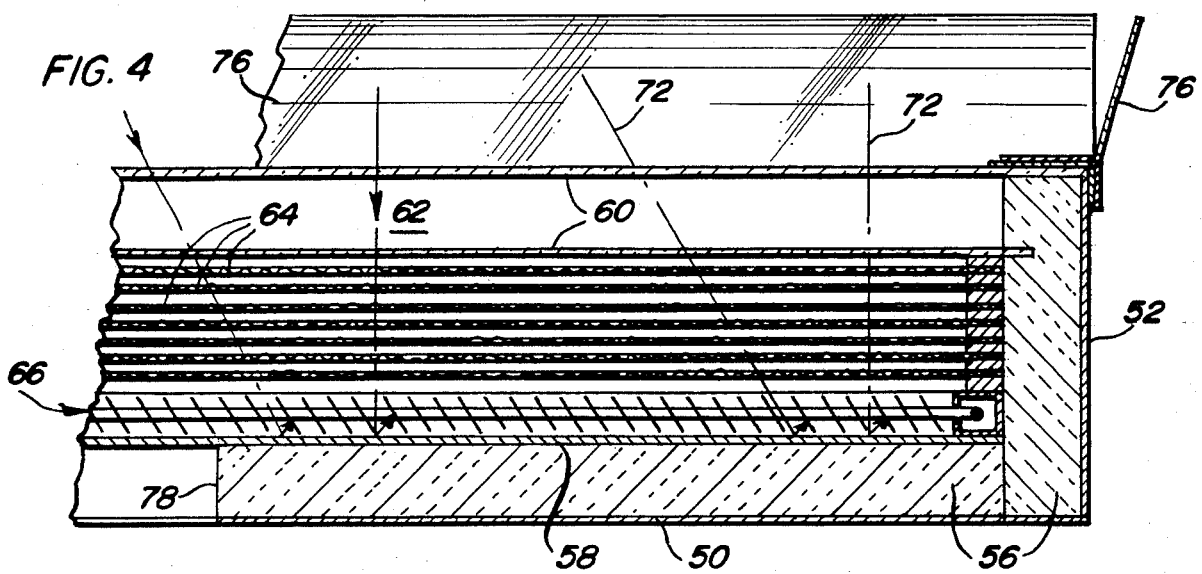
FIG. 4 is a fragmental sectional view, on an enlarged scale, illustrating the structural details of the solar collector.
Figure 5:
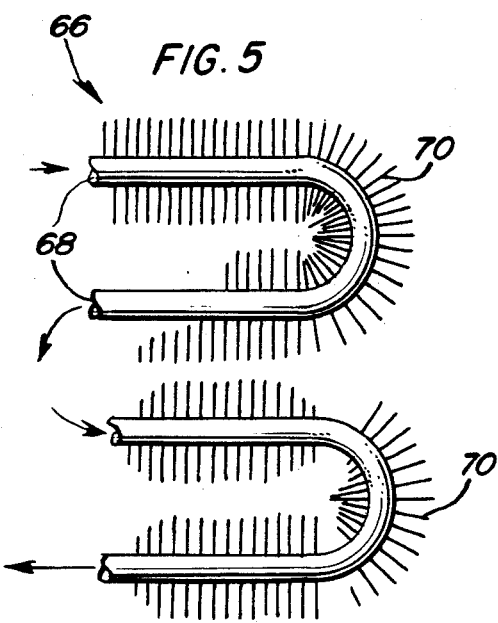
FIG. 5 is a fragmental plan view illustrating the tube and fin assembly forming part of the solar collector.

One of the significant features of the invention which increases its efficiency is the particular construction of the fins 70 and the association of the reflective foil 58 which reflects sun rays back to the underside of the fins as illustrated by the rays 72 in FIG. 4. Thus both surfaces of the fins 70 are used to absorb energy from the sun rays 72 thereby increasing water temperature in the tube 68 and air temperature for circulation through the duct system. The return register or registers 106 may have ducts connected thereto or use the hollow wall between studs to convey air upwardly. The return air may return to a blower in return duct 88 to maintain a positive pressure in the collector in which event the blower 102 may be omitted. Also, by using a blower or return duct 88 and a return duct from register 106 to the blower, a control damper may be provided to control the intake of outside fresh air through eave vents in a well known manner. Thus, either blower arrangement can be used with both the return and supply being provided with a distribution box and check valve.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the inventon.

What is claimed as new is as follows:

1. A sun tracking solar air heating system for buildings having a roof and an enclosed space below the roof for receiving heated air from the air heating system, said heating system comprising a solar collector, means mounting the solar collector on the roof in inclined relation for facing the sun, means connected to the solar collector for pivoting the solar collector about an inclined axis to the horizon for tracking the sun across the sky from sun up to sundown and returning the solar collector to an original position during the nighttime, and a flexible duct system connected with the solar collector and extending through the roof for communication with the space to be heated, said flexible duct system being connected to the solar collector and the roof in a manner to maintain the waterproof integrity of the roof and solar collector, said flexible duct system including an enlarged flexible duct having insulating material in the interior thereof, a pair of smaller flexible insulated ducts disposed within the larger duct for circulation of warm air downwardly from the solar collector and upward movement of cold air into the solar collector, said solar collector being of box-like configuration and provided with a heat absorber therein and an open top closed by glazing material to provide a dead air space within the collector and a plurality of screen mesh panels oriented in spaced relation and positioned interiorly of the solar collector for storing heat within the collector and increasing the temperature of the interior of the collector.

2. The structure as defined in claim 1 together with blower means incorporated into said flexible duct system for circulating air between the solar collector and enclosed space.

3. The structure as defined in claim 2 wherein said flexible duct system includes means to prevent air circulation therethrough when the blower means is inactive to preclude entry of heated moist air into the solar collector at night or during cool periods of the day.

4. The structure as defined in claim 1 wherein said means connected to the solar collector for pivoting it for tracking the sun includes a screw threaded member pivotally attached to the solar collector and a timer operated reversible motor connected with the screw threaded member to move the solar collector about an inclined axis as the sun moves across the sky.

5. The heating system as defined in claim 1 wherein said flexible duct system includes gravity actuated dampers to close the air circulating flexible ducts when air is not forced through the ducts.

6. The structure as defined in claim 1 wherein said heat absorber includes a tube assembly defining a plurality of paths of movement for water through the tube assembly, said tube assembly including a plurality of fins of unitary construction therewith and extending laterally therefrom in longitudinally aligned rows and mutually spaced relation with the fins being twisted at the inner ends thereof integral with the tube and including an inclined surface facing the sun for impingement of the sun's rays thereon.

7. The structure as defined in claim 6 wherein said solar collector also includes an upwardly extending shield peripherally of the glazing and extending above the glazing with the shield being outwardly inclined for reflecting sun rays into the interior of the collector to provide more efficient heating of fluids passing through the solar collector and eliminate movement of cold air across the glazing surface of the collector.

8. A sun tracking solar air heating system for buildings having a roof and an enclosed space below the roof for receiving heated air from the air heating system, said heating system comprising a solar collector, means mounting the solar collector on the roof in inclined relation for facing the sun, means connected to the solar collector for pivoting the solar collector about an inclined axis to the horizon for tracking the sun across the sky from sun up to sundown and returning the solar collector to an original position during the nighttime, and a flexible duct system connected with the solar collector and extending through the roof for communication with the space to be heated, said flexible duct system being connected to the solar collector and the roof in a manner to maintain the waterproof integrity of the roof and solar collector, said flexible duct system including an enlarged flexible duct having insulating material in the interior thereof, a pair of smaller flexible insulated ducts disposed within the larger duct for circulation of warm air downwardly from the solar collector and upward movement of cold air into the solar collector, said solar collector including a heat absorber therein, said heat absorber including a finned tube, a pair of flexible pipes connected with said finned tube for circulation of liquid therethrough, said flexible pipes being disposed within said enlarged flexible duct for circulation of heated liquid for use in heating the enclosed space or as domestic hot water.

9. A sun tracking solar air heating system for buildings having a roof and an enclosed space below the roof, said heating system comprising a solar collector, means mounting the solar collector on the roof in inclined relation for facing the sun, means connected to the solar collector for pivoting the solar collector about a vertically inclined axis relative to the horizon for tracking the sun across the sky from sun up to sundown and returning the solar collector to an original position during the nighttime, and a flexible duct system connected with the solar collector and extending through the roof for communication with the space to be heated, said flexible duct system being connected to the solar collector and the roof in a manner to maintain the waterproof integrity of the roof and solar collector, said solar collector being of box-like configuration and provided with an open top closed by glazing material to provide an air space within the collector and a plurality of screen mesh panels oriented in spaced relation and positioned interiorly of the solar collector for storing heat within the collector and increasing the temperature of the air space within the collector, said flexible duct system including an enlarged flexible duct, a pair of smaller flexible ducts disposed within the larger duct for circulation of warm air downwardly from the solar collector and upward movement of cold air into the solar collector.

10. The structure as defined in claim 9 wherein said solar collector includes a finned tube heat absorber in said air space, a pair of flexible pipes connected to the tube and extending through the enlarged flexible duct for circulation of liquid heat exchange medium through the heat absorber.

* * * * *